Feb. 6, 1968 G. ROSSI 3,367,472
DEVICE FOR AUTOMATIC INTRODUCTION AND DISCHARGE OF CONTAINERS
IN PAINTING MACHINES AND THE LIKE
Filed May 17, 1966 3 Sheets-Sheet 1
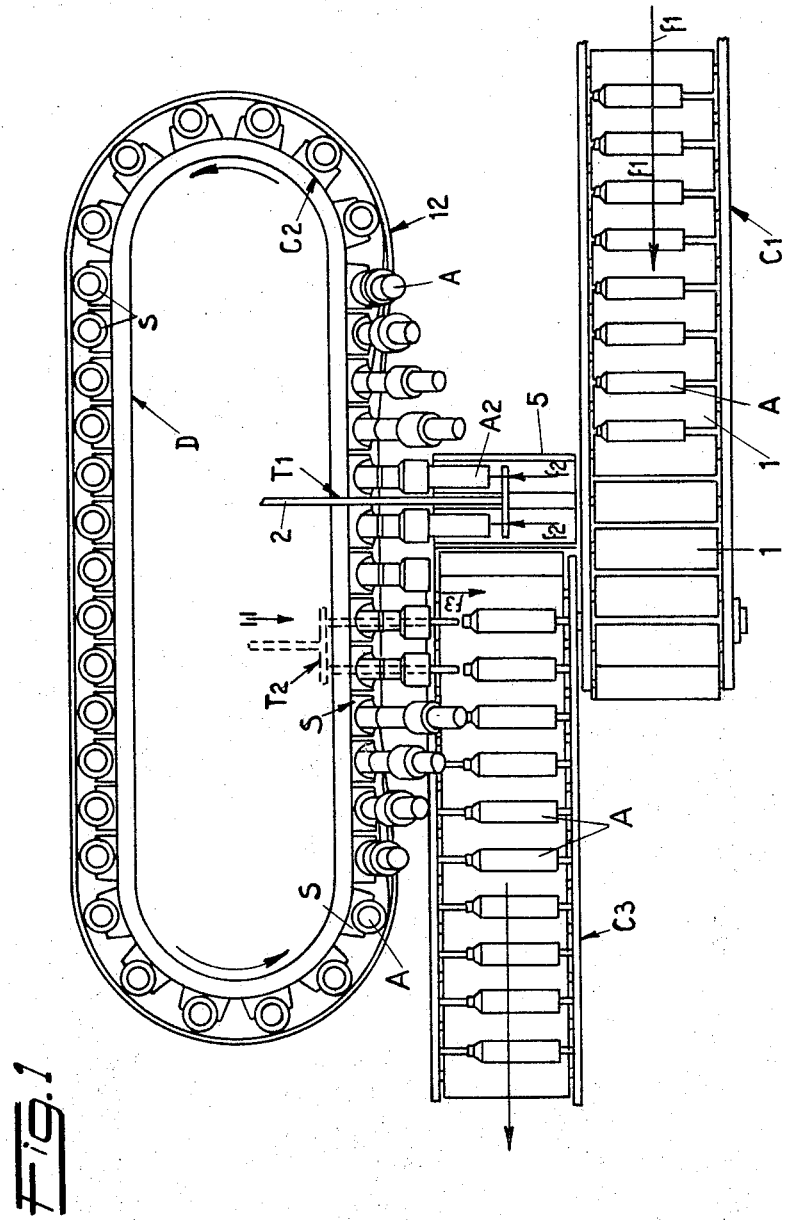
INVENTOR.
GIOVANNI ROSSI

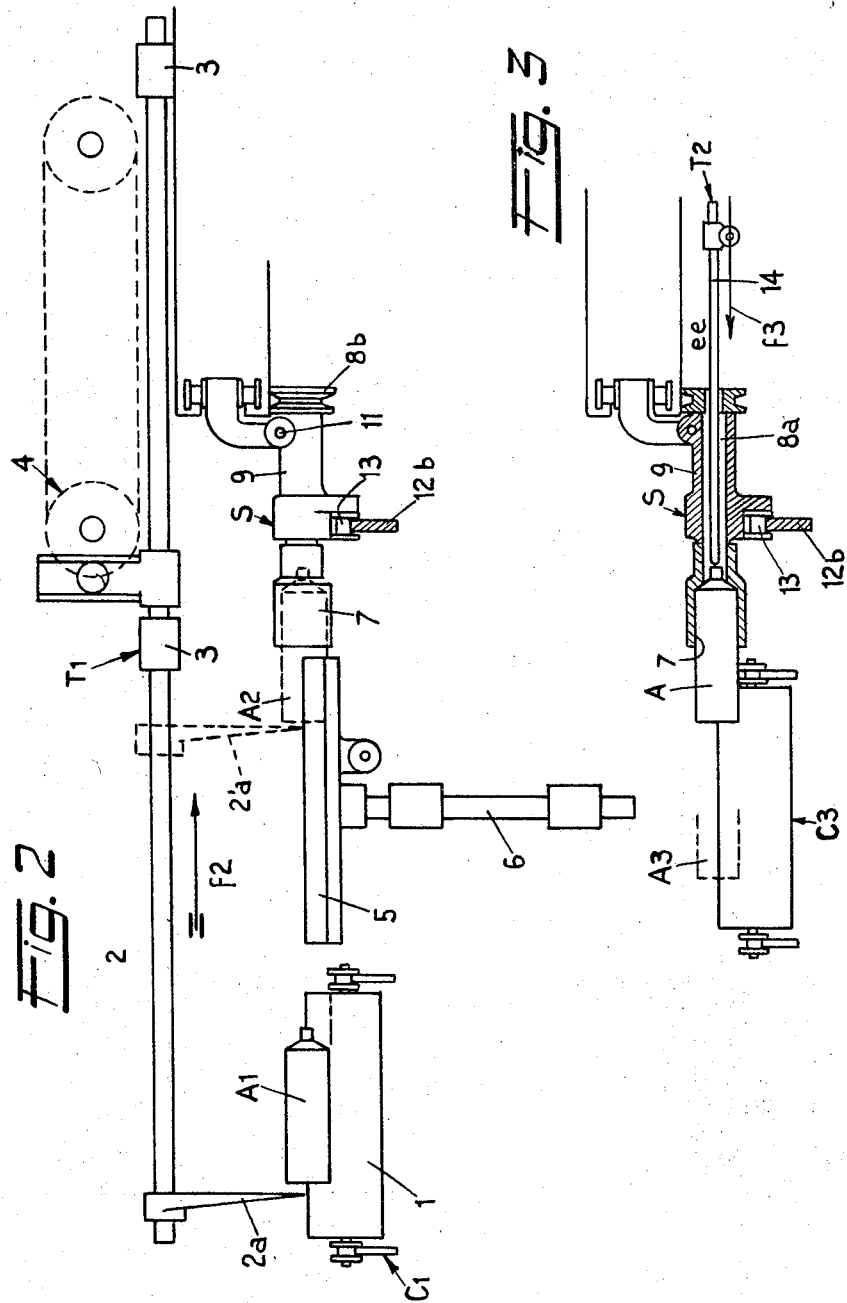

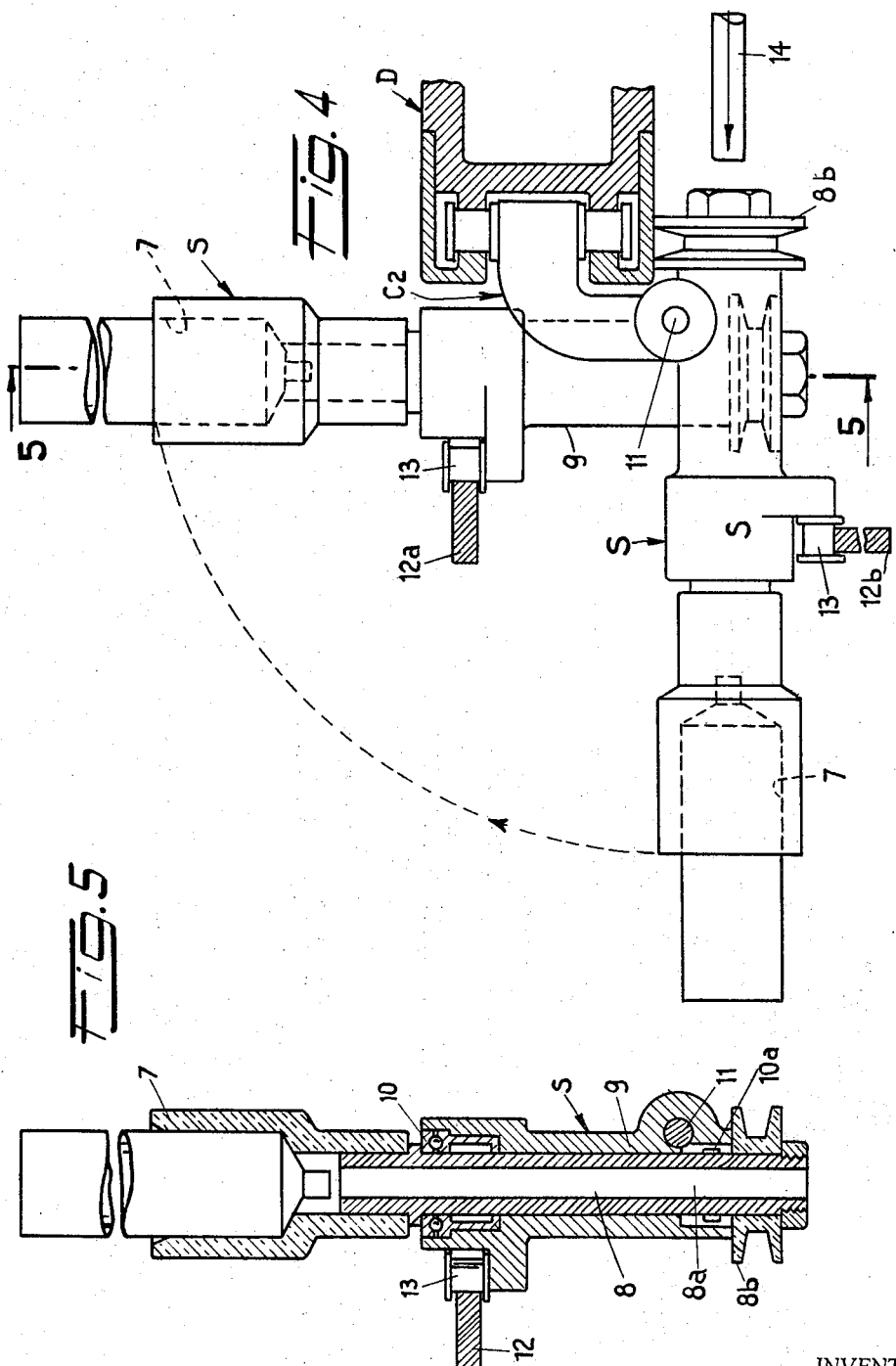

United States Patent Office 3,367,472
Patented Feb. 6, 1968

3,367,472
DEVICE FOR AUTOMATIC INTRODUCTION AND DISCHARGE OF CONTAINERS IN PAINTING MACHINES AND THE LIKE
Giovanni Rossi, Via Trieste 5, Parma, Italy
Filed May 17, 1966, Ser. No. 550,814
10 Claims. (Cl. 198—22)

ABSTRACT OF THE DISCLOSURE

A conveyor mechanism is disclosed for automatically introducting cylindrical containers into a finish applying machine, such as a painting machine, and automatically removing the containers from the machine. The conveying mechanism includes a first endless conveyor carrying a plurality of supports which are mounted thereon for swinging between a horizontal, work-receiving position, and a vertical work-transporting position. An endless guide rail is provided for swinging the supports between the horizontal position, at an unloading station followed by a loading station, and a vertical position as the work travels through the painting machine.

An endless feed conveyor, of the roller-type, carries the articles in uniformly spaced relation to the loading station, the feed conveyor operating in synchronism with the main conveyor. A transfer means at the loading station reciprocates transversely relative to the feed conveyor to move articles, such as cans, from the feed conveyor and position them on the then horizontally oriented supports on the main conveyor. The work carrying supports are tubular, and an ejecting means at the unloading station moves axially through the supports to eject the finished containers onto a third conveyor which moves the finished conveyors away from the apparatus.

Background of the invention

Metal containers, such as flexible dispensers, cans and the like, as well as spray bottles and so forth, have hitherto been fed manually to a painting machine or the like which applies a finished coating to the articles. While various arrangements have been suggested for automatically feeding the articles to a painting machine of the like, known arrangements have not met with commercial success.

Summary of the invention

The invention relates to apparatus for the automatic introduction and discharge of containers relative to painting machines and the like.

A main endless conveyor is provided for carrying the containers through the painting machine, and this main endless conveyor has a substantially vertically oriented support surface which carries a plurality of supports at uniformly spaced intervals therealong. The supports are swingable mounted on the main conveyor for swinging between a horizontal position, at a loading station and at an unloading station, and a vertical position while the containers are passing through the painting machine.

A feed conveyor is operated in synchronism with the main conveyor and is preferably a roller-type conveyor. The feed conveyor brings the articles, in uniformly spaced relation therealong, to a loading station. At the loading station, a transfer mechanism is provided which is reciprocable laterally of the feed conveyor and shifts the containers axially onto then horizontally oriented supports on the main conveyor. The supports are then swung to a vertical orientation by means of an endless guide rail engageable with the supports, and the containers are carried through the painting machine or the like while being thus vertically oriented.

As the containers leave the painting machine, the guide rail effects a swinging of the supports to a generally horizontal orientation at an unloading station, where an ejecting means, reciprocable transversely of the main conveyor and axially of the supports mechanically ejects the finished containers onto a third conveyor, also preferably of the roller-type, which transports the finished containers away from the painting machine.

An object of the invention is to automatize introduction and discharge operations of metal containers and the like with respect to finishing machines such as painting machines.

Another object of the invention is to provide apparatus for effecting introduction of containers into a painting machine and ejection of the finished containers from the painting machine, and which apparatus can be used not only with new machines, and which apparatus can be used not only with new machines but may also be incorporated into existing machines.

A further object of the invention is to provide an apparatus of the type mentioned which includes a main conveyor, a feed conveyor, and a discharge conveyor all operated in synchronism with each other.

Still another object of the invention is to provide such an apparatus including transfer means, operable in synchronism with the conveyors, for transferring the containers from the feed conveyor to the main conveyor and from the main conveyor to the discharge conveyor.

A further object of the invention is to provide such an apparatus which is simple and effective in operation and economical to construct and maintain.

Brief description of the drawings

For an understanding the principles of the invention, reference is made to the following description of a typical embodiment thereof as illustrated in the accompanying drawings.

In the drawings:

FIG. 1 is a somewhat schematic plan view of apparatus embodying the invention;

FIG. 2 is a side elevation view of transfer means for transferring containers from a feed conveyor to the main conveyor at a loading station;

FIG. 3 is a side elevation view of ejecting means at an unloading station operable to transfer finished containers from the main conveyor to a discharge container;

FIG. 4 is an elevation view, partly in section, illustrating the container support means of the main container to a larger scale; and FIG. 5 is a sectional view taken on the line 5—5 of FIG. 4.

Description of the preferred embodiment

Referring first to FIG. 1, an endless conveyor C1 comprising rollers 1 transports containers A in the direction of the arrow f1 to a loading station at which the containers A are transferred to an endless conveyor C2 included in the painting or finishing machine. The finished containers A are ejected from the conveyor C2 at an unloading station by ejecting means T2. The conveyors are transported away from the work area by an endless conveyor C3 likewise of the roller-type.

The supply or feed conveyor C1 operates in exact synchronism with the main conveyor C2, and the movement of the conveyors may either be continuous or stepwise. The containers A are carried on the conveyor C1 at uniformly spaced intervals corresponding exactly to the uniform spacing of supports S carried by the main conveyor C2. Preferably, containers A are placed on conveyor C1 with their necks or openings facing toward the conveyor C2. To provide for synchronized operation of the conveyors C1 and C2, both conveyors may be operated by the same driving means or the two conveyors may be mechanically coupled with each other.

At the loading station, the transfer means T1 moves containers A, preferably two at a time, in the direction of the arrow f2 onto the supports S. Referring to FIG. 2, the transfer means comprises a relatively elongated rod 1 which is reciprocable in guides 3 by means of an endless chain drive 4 whose operation is synchronized with that of main conveyor C2.

Rod 2 may have one or more fingers 2a at its free end, and these fingers engage the bottom ends of the containers, such as A1, carried by the rollers 1 of conveyor C1, and push the containers A1 onto guide rails 5. The guide rails 5 are carried by a support 6 which is arranged for vertical and horizontal adjustment to assure exact alignment of containers A1 on conveyor C1 with the supports S on the conveyor C2.

The supports S are swingably mounted upon conveyor C2 for swinging between a generally horizontal orientation, in which they face outwardly of conveyor C2, and a generally vertical orientation. In the horizontal orientation of the supports S, housings or receptacles 7 of the support face the guide rails 5 so that the transfer means T1 can move containers to the position shown at A2 in FIG. 2 wherein the containers are inserted into the receptacles 7. The direction of such movement is indicated by the arrow f2, and the position of finger 2a when a container A2 has been moved into receptacle 7 is indicated at 2'a.

Referring to FIGS. 4 and 5, each support S includes the receptacle 7 which is fixed on the end of a tubular sleeve 8 rotatably mounted within an outer sleeve 9. For this purpose, bearings 10 and 10a are provided between sleeves 8 and 9. A pulley or the like 8b is provided on the projecting lower end of the inner sleeve 8 for rotating the sleeve to rotate the workpiece while the latter is being transported through the painting or finishing machine.

Each support 9 is swingable on a generally horizontal pivot 11 fixed on the frame D of conveyor C2, so that each support S may be swung between the horizontal and vertical positions indicated in FIG. 4. Such swinging of the supports S is effected by engagement of flanged pulleys 13 on each support S, these pulleys engaging a substantially rectangular cross section guide rail 12. The guide rail 12 is continuous around the conveyor C1, and the main portion 12a of the guide rail has an elevated and generally horizontal orientation as indicated in FIG. 4 and in which it holds a support S in the vertical or upright position. Adjacent the loading and unloading stations, the guide rail 12 has a section 12b at a lower elevation, and the section 12b has a generally vertical orientation, the level of section 12b being such that the supports S are gradually moved into a substantially horizontal and outwardly projecting position and then gradually moved into the upright position.

Containers A placed in the receptacle 7 of supports S are first swung to the upright position and then transported through the painting machine. After passing through the painting machine, the containers A arrive at the unloading station where they are ejected from the supports S onto the conveyor C3. An ejecting means is provided at the unloading station, and this ejecting means is shown in greater detail in FIG. 3.

Referring to FIG. 3, the ejecting means T2 comprises an elongated rod 14 which is reciprocable in suitable guides. Reciprocation of ejecting means T2 is effected in synchronism with conveyor C2 and, at the ejection station, the rod 14 is projected through the bore 8a of the inner sleeve 8 of each support S to engage the neck end of a container A then positioned in a receptacle 7. The container A is thereby pushed out of the receptacle 7 and onto the discharge conveyor C3, as indicated at A3. Ejection is effected in the direction of the arrow f3 of FIG. 3.

While the conveyor C2 for transporting the workpieces through the painting machine is illustrated as having a generally elliptical form, the form of conveyor C may be other than elliptical in plan, the particular form of conveyor C2 being coordinated with the design of the painting machine with which it is to be operated. However, in any case all of the operations are automatic and are synchronized with the operation of the painting machine.

In the foregoing description, it will be clear that the present invention provides an apparatus which may be readily adapted to various applications and various capacities.

While a specific embodiment of the invention has been shown and described in detail to illustrate the application of the principles of the invention, it will be understood that the invention may be embodied otherwise without departing from such principles.

What is claimed is:

1. Apparatus for automatically introducing cylindrical containers into, and discharging the containers from, a finish applying machine, said apparatus comprising, in combination, a first endless conveyor forming part of said machine and having its support surface vertically oriented; a plurality of supports carried by said first conveyor in uniformly spaced relation therealong and mounted on said support surface for swinging movement between a substantially vertical position and a substantially horizontal and outwardly projecting position, each support having a free end constructed to receive and support a container for travel through said machine; guide means continuously engaged with said supports and swinging the latter between a horizontal position, at loading and unloading stations, and a vertical position, for travel through said machine; a second endless conveyor movable in synchronism with said first conveyor and having a horizontally oriented support surface formed to receive and support containers in uniformly spaced relation therealong corresponding to the uniformly spaced relation of said supports; said second conveyor extending to said loading station and transporting the containers thereto in longitudinally aligned spaced relation with said supports thereat; transfer means at said loading station operable, in synchronism with said first conveyor, to engage and shift containers on said second conveyor longitudinally from the latter and onto respective then horizontally oriented supports at said loading station; ejecting means at said unloading station operable, in synchronism with said first conveyor, to engage and eject containers from then horizontally oriented supports at said unloading station; and receiving means receiving the ejected containers.

2. Apparatus, as claimed in claim 1, in which said receiving means comprises a third endless conveyor movable in synchronsm with said first conveyor and having a horizontally oriented support surface formed to receive and support ejected containers in uniformly spaced relation therealong corresponding to the uniformly spaced relation of said supports.

3. Apparatus, as claimed in claim 1, in which said transfer means is reciprocable transversely of said first and second conveyors.

4. Apparatus, as claimed in claim 1, in which said ejecting means is reciprocable transversely of said first container and longitudinally of the then horizontally oriented supports at said unloading station.

5. Apparatus, as claimed in claim 3, in which said transfer means comprises a relatively elongated rod; means supporting said rod for longitudinal reciprocation; driving means connected to said rod for reciprocating the same and operable in synchronism with said first conveyor; and finger means on said rod engageable with those ends of the containers remote from said supports at said loading station.

6. Apparatus, as claimed in claim 4, in which said supports are tubular; said ejecting means comprising rod means reciprocable into and through then horizontally oriented supports at said unloading station, through the inner ends of said supports; and drive means connected to said rod means and operable to reciprocate the same in synchronism with said first conveyor.

7. Apparatus, as claimed in claim 2, including guide means at said loading station extending between said second conveyor and the then horizontally oriented supports in alignment with the latter; said transfer means shifting said containers longitudinally along said guide means.

8. Apparatus, as claimed in claim 7, including support means supporting said guide means, said support means being adjustable to effect vertical and horizontal alignment of said guide means with the then horizontally oriented supports on said first conveyor.

9. Apparatus, as claimed in claim 1, in which each support comprises an outer tubular sleeve pivotally supported on the support surface of said first container; an inner tubular sleeve telescoped through said outer tubular sleeve and rotatably mounted therein, said inner tubular sleeve being constructed to receive and support a container; and driving means on said inner sleeve for rotating the latter during travel of said supports through said machine.

10. Apparatus, as claimed in claim 9, in which said guide means comprises an endless rail extending parallel to the support surface of said first conveyor; the outer sleeve of each support carrying rotatably, adjacent its free end, a flanged pulley engageable with an edge of said rail; said rail having a section at said loading and unloading stations which is at a level lower than said first conveyor and in which section said rail has a substantially vertical orientation, the level of said rail at said loading and unloading stations being such as to provide for swinging of said supports to the substantially horizontal position thereof; said rail sloping upwardly in both directions from said loading and unloading stations to a higher level throughout the remainder of its length and in which said rail has a substantially horizontal orientation and lateral disposition, relative to the support surface of said first conveyor, such as to maintain said supports in the substantially vertical position.

References Cited
UNITED STATES PATENTS

| | | | |
|---|---|---|---|
| 1,910,713 | 5/1933 | Prussing | 198—20 |
| 2,800,872 | 7/1957 | Remington | 198—20 |
| 3,066,784 | 12/1962 | Remington et al. | 198—20 |

RICHARD E. AEGERTER, *Primary Examiner.*

EVON C. BLUNK, *Examiner.*

A. C. HODGSON, *Assistant Examiner.*